US010719817B2

(12) United States Patent
Just et al.

(10) Patent No.: US 10,719,817 B2
(45) Date of Patent: Jul. 21, 2020

(54) WEARABLE TRANSACTION DEVICES (71) Applicant: Capital One Financial Corporation, McLean, VA (US)

(72) Inventors: Richard S. Just, Berkeley, CA (US); Cameron M. Geiser, Montara, CA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/868,397

(22) Filed: Jan. 11, 2018

(65) Prior Publication Data
US 2018/0137482 A1 May 17, 2018

Related U.S. Application Data (63) Continuation of application No. 14/533,785, filed on Nov. 5, 2014, now Pat. No. 10,074,080.

(60) Provisional application No. 61/900,730, filed on Nov. 6, 2013.

(51) Int. Cl.
G06Q 20/10 (2012.01)
G06Q 20/40 (2012.01)
G06Q 20/32 (2012.01)
G06F 3/01 (2006.01)

(52) U.S. Cl.
CPC .......... G06Q 20/10 (2013.01); G06Q 20/32 (2013.01); G06Q 20/40 (2013.01); G06F 3/017 (2013.01)

(58) Field of Classification Search
CPC ...... G06F 3/017; G06F 3/04883; G06F 1/163; G06Q 30/02; G06Q 20/32
See application file for complete search history.

(56) References Cited

U.S. PATENT DOCUMENTS

| 8,768,249 | B2 * | 7/2014 | Avadhanam | G06F 9/44505 340/501 |
| 8,868,522 | B1 * | 10/2014 | Zennaro | G06F 17/30241 707/694 |
| 8,994,646 | B2 * | 3/2015 | Hinckley | G06F 1/1694 345/156 |
| 9,235,933 | B2 * | 1/2016 | Hamada | G06T 19/006 |
| 9,377,859 | B2 * | 6/2016 | Clarkson | G06F 3/017 |
| 9,576,285 | B2 * | 2/2017 | Zhou | G06Q 20/3278 |
| 2010/0167646 | A1 * | 7/2010 | Alameh | G06F 3/017 455/41.2 |

(Continued)

Primary Examiner — Calvin L Hewitt, II
Assistant Examiner — Sima Asgari
(74) Attorney, Agent, or Firm — Finnegan, Henderson, Farabow, Garrett & Dunner, LLP (57) ABSTRACT The disclosed embodiments include wearable transaction devices. A wearable transaction device may client device for executing a transaction. The client device may include interface hardware for communicating transaction information, a memory device for storing the transaction information, and sensor hardware configured to sense an action performed by a user. The client device may also include one or more hardware processors configured to access the transaction information, and identify an operation based on at least the transaction information. The one or more hardware processors may be further configured to determine that the operation is authorized by the user, and transmit a notification to a server based on the determination that the operation is authorized by the user, the notification including at least an indication of the identified operation.

16 Claims, 7 Drawing Sheets (56) References Cited

U.S. PATENT DOCUMENTS

| | | | | |
|---|---|---|---|---|
| 2012/0078788 A1* | 3/2012 | Gandhi | ............ | G06Q 20/40 |
| | | | | 705/44 |
| 2012/0200601 A1* | 8/2012 | Osterhout | ......... | G02B 27/0093 |
| | | | | 345/633 |
| 2013/0052954 A1* | 2/2013 | Avadhanam | ....... | H04M 1/7253 |
| | | | | 455/41.2 |
| 2013/0278631 A1* | 10/2013 | Border | ............. | G02B 27/017 |
| | | | | 345/633 |
| 2014/0106677 A1* | 4/2014 | Altman | ............ | H04B 1/3827 |
| | | | | 455/41.2 |
| 2015/0035643 A1* | 2/2015 | Kursun | ........... | G07C 9/00134 |
| | | | | 340/5.52 |
| 2015/0081544 A1* | 3/2015 | Schulz | .......... | G06Q 20/40145 |
| | | | | 705/44 |
| 2016/0277891 A1* | 9/2016 | Dvortsov | ............ | H04W 4/023 |

* cited by examiner

WEARABLE TRANSACTION DEVICES

PRIORITY CLAIM

This application is a continuation of U.S. application Ser. No. 14/533,785, filed Nov. 5, 2014, which claims priority under 35 U.S.C. § 119 to U.S. provisional application No. 61/900,730, filed on Nov. 6, 2013. The contents of both applications are hereby incorporated by reference in their entireties.

TECHNICAL FIELD

The disclosed embodiments generally relate to systems and methods for device-to-device transactions and, more particularly, to systems and methods for wearable device transactions.

BACKGROUND

There exist various methods for executing transactions between two individuals. For example, one person may write another person a check to make a payment. Checks, however, are less than ideal due to various factors, such as a delay in actual transfer of funds and/or a requirement for the recipient to complete an additional process to deposit or cash the check.

Alternatively, one or more persons may use electronic devices to complete a transaction, such as by transferring money via one or more financial services on a computer. But current means for transferring money or making other electronic transactions may also have drawbacks. For example, many money transfer services require filling out forms that require specific information such as account details or financial service provider details.

Therefore, there exists a need to provide electronic transaction services that allow one or more users to complete a transaction in a simple and efficient manner.

SUMMARY

Consistent with disclosed embodiments, systems, methods, and computer-readable media are provided for device-to-device transactions. In an exemplary embodiment, the devices may be wearable devices.

Consistent with a disclosed embodiment, a client device for executing a transaction is disclosed. The client device may include interface hardware for communicating transaction information related to a transaction between the client device and a second client device, a memory device for storing the transaction information, and sensor hardware configured to sense an action performed by a user operating the client device and generate a signal indicative of the performed action. The client device may also include one or more hardware processors configured to access the transaction information from the memory device when the sensor hardware senses the performed action, and identify an operation based on at least the transaction information. The one or more hardware processors may be further configured to determine that the operation is authorized by the user based on at least the signal, and transmit a notification to a server based on the determination that the operation is authorized by the user, the notification including at least an indication of the identified operation.

Consistent with another embodiment, a system for executing a device-to-device transaction is provided. The system may include one or more memory devices storing software instructions, and one or more processors configured to execute the software instructions to receive at least one notification indicating that a first action was performed using a first device and a second action was performed using a second device. The one or more processors may be further configured to execute the software instructions to determine that the first and second actions are associated based at least on the received notifications, and identify a transaction requested by the first and second actions based on the determination and transaction information indicated in the at least one received notification. The one or more processors may be further configured to execute the software instructions to validate the identified transaction based on one or more criteria for authorizing the transaction, and initiate the identified transaction based on the validation.

Consistent with another disclosed embodiment, a system for executing a transaction is disclosed. The system may include a wearable device including a motion sensor configured to generate a signal indicative of movement of the wearable device. The system may include a processing device including: an interface for receiving transaction information related to a transaction, the transaction information including an amount of the transaction, a location determination device configured to determine a location of the wearable device during the movement, and a time determination device configured to determine a time the movement occurred. The processing device may be configured to determine that the movement corresponds to the transaction, based on the signal, and transmit a notification to a server indicating the transaction information, the location, and the time.

Consistent with other disclosed embodiments, tangible computer-readable storage media may store program instructions that are executable by one or more processors to implement any of the processes disclosed herein.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DESCRIPTION

Reference will now be made in detail to the disclosed embodiments, examples of which are illustrated in the accompanying drawings. Wherever convenient, the same reference numbers will be used throughout the drawings to refer to the same or like parts.

Disclosed embodiments include systems and method for performing device-to-device transactions. The systems and method include various features that allow at least one device to interpret an action taken by a user as an indication that a transaction should be completed. For example, a device may identify a particular movement of a wearable device as an indication that a pre-defined transaction is being authorized. Similarly, a system may determine that multiple devices were used in a concerted action (e.g., a handshake), indicating that a certain transaction should take place. In this way, an endless variety of actions may be taken to cause a transaction to occur.

Figure 1:
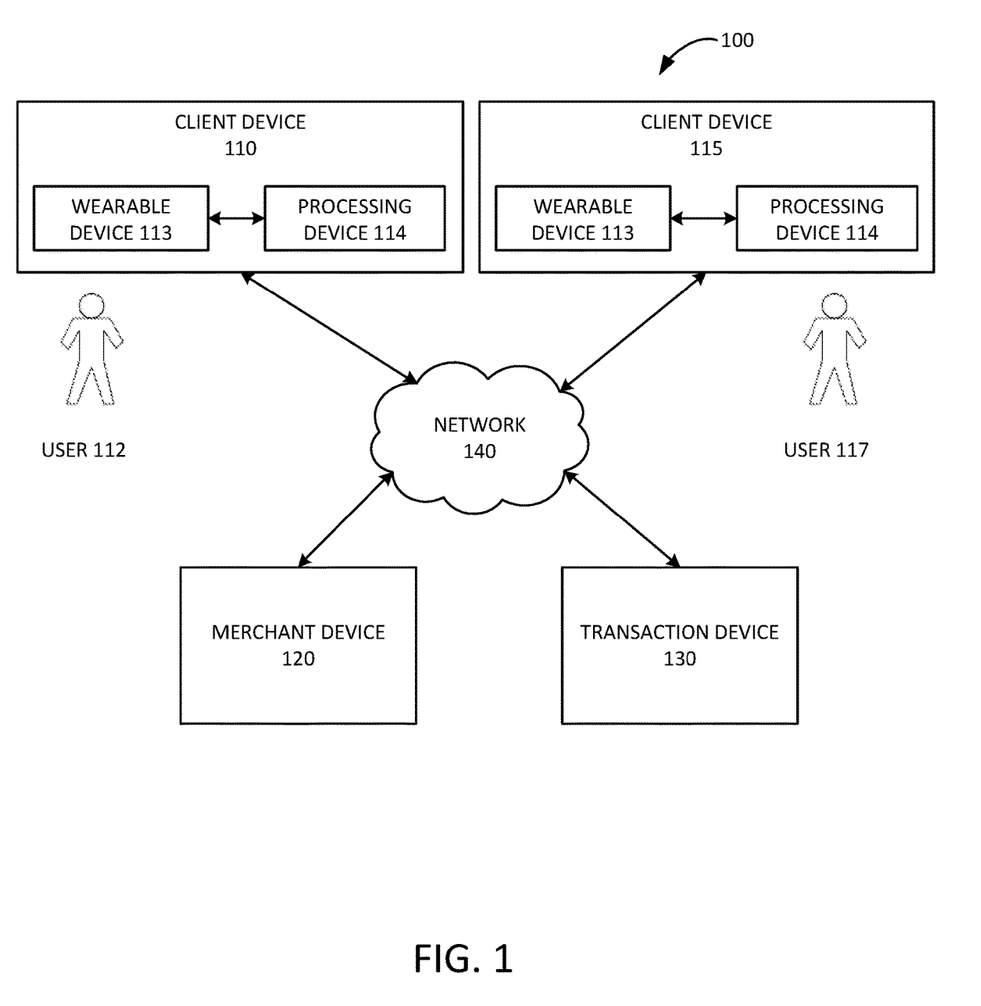
FIG. 1 is a block diagram of an exemplary system, consistent with disclosed embodiments.

FIG. 1 is a block diagram illustrating an exemplary system 100 for performing one or more operations consistent with the disclosed embodiments. In one embodiment, system 100 may include a client device 110, a client device 115, a merchant device 120, a transaction device 130, and a network 140. The components and arrangement of the components included in system 100 may vary. For example, system 100 may include one or more of the components of system 100 and/or other components that perform or assist in the performance of one or more processes consistent with the disclosed embodiments.

Components of system 100 may be computing systems configured to process a transaction. As further described herein, components of system 100 may include one or more computing devices (e.g., computer(s), server(s), embedded systems etc.), memory storing data and/or software instructions (e.g., database(s), memory devices, etc.), etc. In some embodiments, one or more computing devices may be configured to execute software instructions stored on one or more memory devices to perform one or more operations consistent with the disclosed embodiments. Components of system 100 may be configured to communicate with one or more other components of system 100, including client device 110, client device 115, merchant device 120, and transaction device 130. In certain aspects, users may operate one or more components of system 100 to initiate one or more operations consistent with the disclosed embodiments. For example, client device 110 may be operated by a user 112. User 112 may be an operator of client device 110 and/or a customer of one or more entities associated with components of system 100. A user 117 may be similarly associated with client device 115. In other aspects, users associated with one or more of the components of system 100 (e.g., a user associated with merchant device 120) may be employees of, or otherwise associated with, the entity corresponding to the respective component(s) of system 100 (e.g., someone authorized to use the underlying computing systems or otherwise act on behalf of the entity). In other aspects, the one or more users may not be an employee or otherwise associated with the underlying entity.

Client device 110 may be one or more computing devices configured to execute software instructions for performing one or more operations consistent with the disclosed embodiments. In an exemplary embodiment, client device 110 may include a wearable device 113. Wearable device 113 may be capable of being worn on a part of a user's body. In some embodiments, wearable device 113 may be configured to receive input from user 112. In some aspects, wearable device 113 may receive input from user 112 through an I/O device, such as a touch screen or keypad. In other aspects, wearable device 113 may receive the input from user 112 via sensors associated with wearable device 113.

In some embodiments, wearable device 113 may be configured to interpret movements of user 112 via a motion sensor, accelerometer, GPS device, etc. These movements may be detected by an associated sensor and received by wearable device 113. A component of client device 110 may receive data associated with the detected movements. Exemplary devices that may be configured to interpret movement of an associated user include "smart bands," such as the Pebble Watch® manufactured by Pebble Technologies® and the Myo® armband manufactured by Thalmic Labs®.

In addition or alternatively, wearable device 113 may include a sensor in the form of an image capture device. Client device 110 may receive data from the image capture device as input data. For example, wearable device 113 may include a camera or other lens device configured to capture an image as encoded data. The image data may be associated with an instantaneous picture, a sequence of pictures, a continuous stream of images (e.g., video), etc. The data associated with the image may be received by a component of client device 110. Exemplary wearable devices that may include an image capture device include wearable lens devices/headsets, such as Google Glass®.

In some embodiments, wearable device 113 may be a combined sensory device that includes a display component configured to immerse the user in a virtual reality that displays the data received from the sensory devices. The data received by the sensors and/or output to the user as visual images may be received by a component of client device 110. Exemplary virtual reality headset of this kind include the Oculus Rift® headset manufactured by Oculus VR® and a neuroheadset manufactured by EMOTIV®.

Client device 110 may further include a processing device 114. In an exemplary embodiment, processing device 114 may be an integrated component of wearable device 113. For example, processing device 114 may be a processing unit built into wearable device 113. In an alternative embodiment, processing device 114 may be a computing device separate from wearable device 113. For example, processing device 114 may be a mobile device (e.g., tablet, smartphone, etc.), a laptop, a desktop computer, a server, a distributed server, and/or device dedicated hardware device configured to send and receive data to and from wearable device 113 (e.g., via NFC, WiFi, etc.) Processing device 114 may include one or more processors configured to execute software instructions stored in memory, such as memory included in one or more components of client device 110.

In the embodiment in which processing device 114 is separate from wearable device 113, wearable device 113 may also include a processing unit capable of executing software instructions to perform tasks in conjunction with processing device 114. Processing device 114 may communicate with wearable device 113, such as to receive sensory data received and processed by wearable device 113. Processing device 114 and wearable device may be configured to communicate with each other and/or other devices via network 140.

Processing device 114 may include software that, when executed by a processor, performs known Internet-related communication and content display processes. For instance, processing device 114 may execute browser software that generates and displays interface screens including content on a display device included in, or connected to, a component of client device 110.

The disclosed embodiments are not limited to any particular configuration of client device 110, wearable device 113, and processing device 114. In an exemplary embodiment, wearable device 113 may be integrated with processing device 114 as a single mobile device that stores and executes mobile applications that provide wearable device transaction functions, such as a mobile application configured to facilitate a wearable device transaction. In some embodiments, the wearable device transaction functions may be associated with financial transactions, and the mobile application may be associated with a financial service provider configured to process the financial transaction.

Client device 115 may be configured in a similar manner to client device 110. For example, client device 115 may include a wearable device 118 and a processing device 119. As with wearable device 113 and processing device 114, wearable device 118 and processing device 119 may be separate components (e.g., a wearable device and a separate mobile device) or an integrated device (e.g., a wearable device that includes one or more processing units configured to perform all necessary functions). Components of client device 115 may function in substantially the same manner as corresponding components of client device 110.

It should be understood that client devices 110 and/or 115 may be configured without wearable devices 113 and/or 118. In these alternative embodiments, the functionality of wearable devices 113 and/or 118 may be provided by client devices 110 and/or 115. For example, client device 110 and/or 115 may be a mobile device such as a smart phone or tablet capable of being used in one or more of the exemplary disclosed processes.

In some embodiments, wearable device 118 may be the same as wearable device 113. For example, wearable devices 113 and 118 may be smart bands configured to be worn around a portion of each user's arm. It should be understood however, that wearable devices 113 and 118 do not necessarily have to be the same device.

Merchant device 120 may be associated with a merchant, such as one or more providers of goods and/or services, such as a retailer, etc. Merchant device 120 may include one or more computing systems that are configured to perform computer-implemented processes, such as a server, desktop, laptop, mobile device, embedded system or other dedicated hardware, etc. Further, merchant device 120 may include one or more computing devices configured to process and handle purchase transactions at a physical location of the associated merchant, such as point of sale terminals, local servers, kiosks, barcode scanners, etc., at a retailer location. Merchant device 120 may be configured to perform financial transaction processes, such as receiving, processing, and handling purchase transactions, payment processes, etc. associated with the sale of goods and/or services provided by the associated merchant. In some aspects, merchant device 120 may include computing devices that may include back and/or front-end computing components that store consumer transaction data and execute software instructions to perform operations consistent with the disclosed embodiments, such as computers that are operated by employees of the associated merchant (e.g., back-office systems, etc.).

In some embodiments, merchant device 120 may include one or more components configured to interact with client device 110 to complete a wearable device transaction. For example, merchant device 120 may include one or more sensory devices configured to detect signals from client device 110 and/or communicate with client device 110. In addition or alternatively, merchant device 120 may include one or input devices configured to receive data from a user associated with merchant device 120 (e.g., an employee of a merchant associated with merchant device 120) or data from another component of merchant device 120. In one embodiment, merchant device 120 may include a merchant wearable device configured to be worn by a user associated with merchant device 120. The merchant wearable device may be configured to collect input data from the merchant user in a manner similar to that of wearable device 113 (e.g., via sensors that interpret movements of the merchant user).

Transaction device 130 may be a processing device configured to communicate with one or more of client device 110, client device 115, and/or merchant device 120. Transaction device 130 may include one or more processor devices configured to execute software instructions to carry out one or more exemplary disclosed processes. For example, transaction device 130 may be a server or distributed server configured to transmit and receive data to and from other components of system 100 to cooperatively execute a wearable device transaction.

In an exemplary embodiment, transaction device 130 may be a computing device associated with a financial service provider. The financial service provider may be a bank, credit union, credit card issuer, or other type of financial service entity that generates, provides, manages, and/or maintains financial service accounts for one or more users (e.g., user 112). Financial service accounts may include, for example, checking accounts, savings accounts, credit card accounts, loan accounts, rewards accounts, and any other types of financial service account known to those skilled in the art. Financial service accounts may be associated with electronic accounts, such as a digital wallet or similar account that may be used to perform electronic transactions, such as purchasing goods and/or services online. Financial service accounts may also be associated with physical financial service account cards, such as a debit or credit card that a user may carry on their person and use to perform financial service transactions, such as purchasing goods and/or services at a point of sale terminal (i.e., merchant device 120).

The financial service provider may include infrastructure and components that are configured to generate and provide financial service accounts and financial service account cards (e.g., debit cards, credit cards, etc.). The financial service provider may also include infrastructures and components that are configured to manage transactions associated with a customer financial service account. In certain aspects, transaction device 130 may include one or more computing devices configured to communicate with client device 110, client device 115, and merchant device 120 via network 140 to execute processing steps associated with a wearable device transaction.

Network 140 may be any type of network configured to provide communications between components of system 100. For example, network 140 may be any type of network (including infrastructure) that provides communications, exchanges information, and/or facilitates the exchange of information, such as the Internet, a Local Area Network, or other suitable connection(s) that enables the sending and receiving of information between the components of system 100. In other embodiments, one or more components of system 100 may communicate directly through a dedicated communication link(s) (not shown), such as a link between client device 110 and merchant device 120.

In one embodiment, user 112 may use client device 110 to perform one or more processes associated with a wearable device transaction. User 112 may operate wearable device 113 to execute the wearable device transaction. In an exemplary embodiment, user 112 may operate client device 110 in conjunction with client device 115 to complete a wearable device transaction between user 112 and user 117. User 112 may operate wearable device 113 and user 117 may operate wearable device 118. Processing devices 114 and 119, which may be components of wearable devices 113 and 117 or separate devices, may perform additional processes associated with the wearable device transaction. In one exemplary process, user 112 may complete a transfer of money to user 117 through cooperative use of client devices 110 and 115. For example, users 112 and 117 may operate client devices 110 and 115 in a cooperative action that is sensed or otherwise detected by each of client devices 110 and 115. For example, users 112 and 117 may shake hands with each other, with the action of shaking hands respectively detected by client devices 110 and 115. A component of system 100 (e.g., transaction device 130) may receive notification of the completed action and arrange for further processing to complete the transaction.

In another embodiment, user 112 may operate client device 110 in conjunction with merchant device 120 to complete a transaction. For example, user 112 may operate wearable device 113 and a merchant user may operate merchant device 120 to complete a transaction, such as payment to a merchant for goods received from the merchant. It should be understood that a transaction between user 112 and a merchant using client device 110 and merchant device 120 may occur in a similar manner to a transaction between user 112 and user 117 using client device 110 and client device 115, although embodiments are not limited to these processes.

Transaction device 130 may be a facilitating device configured to receive messages and data from one or more of client devices 110, 115, and/or merchant device 120. For example, transaction device 130 may be a financial service provider server configured to determine that a wearable device transaction is in-process and may perform and/or execute additional processes configured to further and/or complete the transaction. The additional processes may include, for example, authentication, notification, and/or payment processing steps.

It is to be understood that the configuration and boundaries of the components of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. For example, merchant device 120 may include financial service provider device 130 for performing operations associated with a financial account provided by a merchant associated with merchant device 120. Such alternatives fall within the scope and spirit of the disclosed embodiments.

Figure 2:
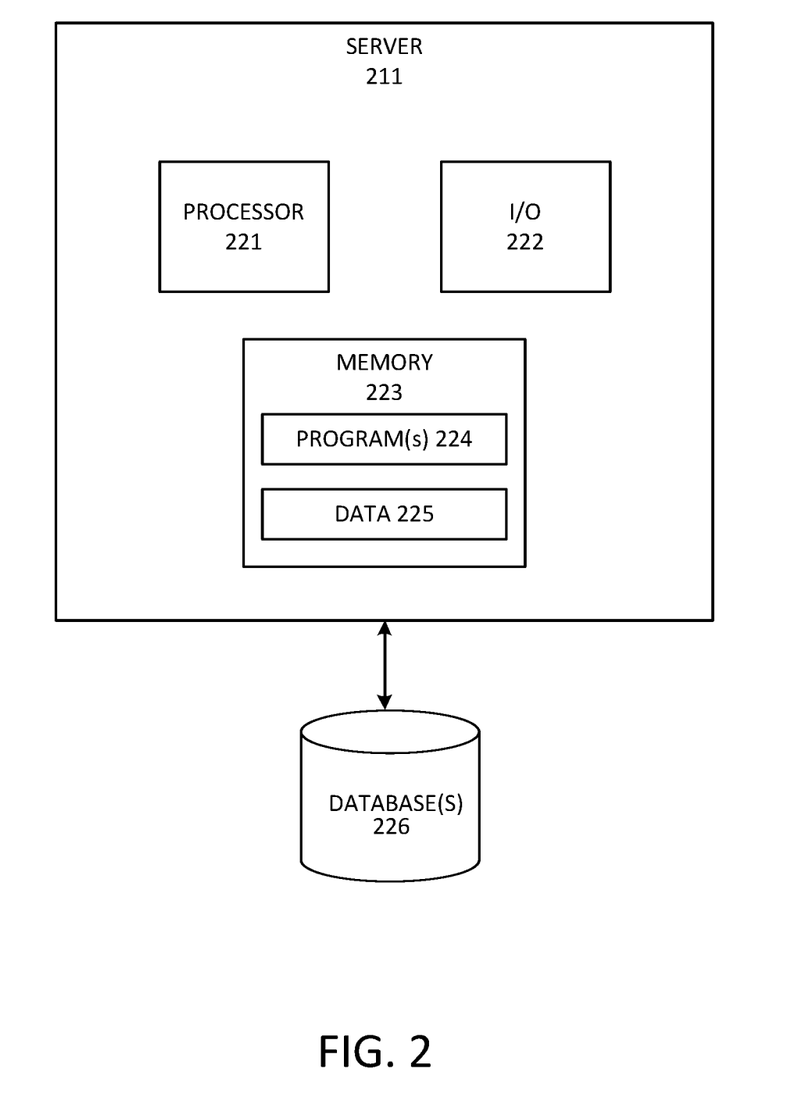
FIG. 2 is a block diagram of an exemplary server, consistent with disclosed embodiments.

FIG. 2 shows an exemplary server 211 for implementing embodiments consistent with the present disclosure. In an exemplary embodiment, server 211 may correspond to transaction device 130. However, it should be understood that variations of server 211 may correspond to client device 110, client device 115, merchant device 120, and/or components thereof.

In one embodiment, server 211 may include one or more processors 221, one or more memories 223, and one or more input/output (I/O) devices 222. According to some embodiments, server 211 may be an embedded system or similar computing devices that generate, maintain, and provide web site(s) consistent with disclosed embodiments. Server 211 may be standalone, or it may be part of a subsystem, which may be part of a larger system. For example, server 211 may represent distributed servers that are remotely located and communicate over a network (e.g., network 140) or a dedicated network, such as a LAN. Server 211 may correspond to any of client device 110, merchant device 120, and financial service provider device 130.

Processor 221 may include one or more known processing devices, such as a microprocessor from the Pentium™ or Xeon™ family manufactured by Intel™ the Turion™ family manufactured by AMD™, or any of various processors manufactured by Sun Microsystems. The disclosed embodiments are not limited to any type of processor(s) configured in server 211.

Memory 223 may include one or more storage devices configured to store instructions used by processor 221 to perform functions related to disclosed embodiments. For example, memory 223 may be configured with one or more software instructions, such as program(s) 224 that may perform one or more operations when executed by processor 221. The disclosed embodiments are not limited to separate programs or computers configured to perform dedicated tasks. For example, memory 223 may include a single program 224 that performs the functions of the server 211, or program 224 could comprise multiple programs. Additionally, processor 221 may execute one or more programs located remotely from server 211. For example, client device 110, merchant device 120, and/or financial service provider device 130, may, via server 211, access one or more remote programs that, when executed, perform functions related to certain disclosed embodiments. Memory 223 may also store data 225 that may reflect any type of information in any format that the system may use to perform operations consistent with the disclosed embodiments.

I/O devices 222 may be one or more devices configured to allow data to be received and/or transmitted by server 211. I/O devices 222 may include one or more digital and/or analog communication devices that allow server 211 to communicate with other machines and devices, such as other components of system 100. I/O devices 222 may further include hardware such as interface hardware configured to display information and receive user feedback, sensor hardware (e.g., motion sensor, camera, etc.) a location determination device, such as a GPS device, a time determination device configured to track time and generate a time stamp, etc.

Server 211 may also be communicatively connected to one or more database(s) 226. Server 211 may be communicatively connected to database(s) 226 through network 140. Database 226 may include one or more memory devices that store information and are accessed and/or managed through server 211. By way of example, database(s) 226 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, system 200 may include database 226. Alternatively, database 226 may be located remotely from the system 200. Database 226 may include computing components (e.g., database management system, database server, etc.) configured to receive and process requests for data stored in memory devices of database(s) 226 and to provide data from database 226.

Figure 3:
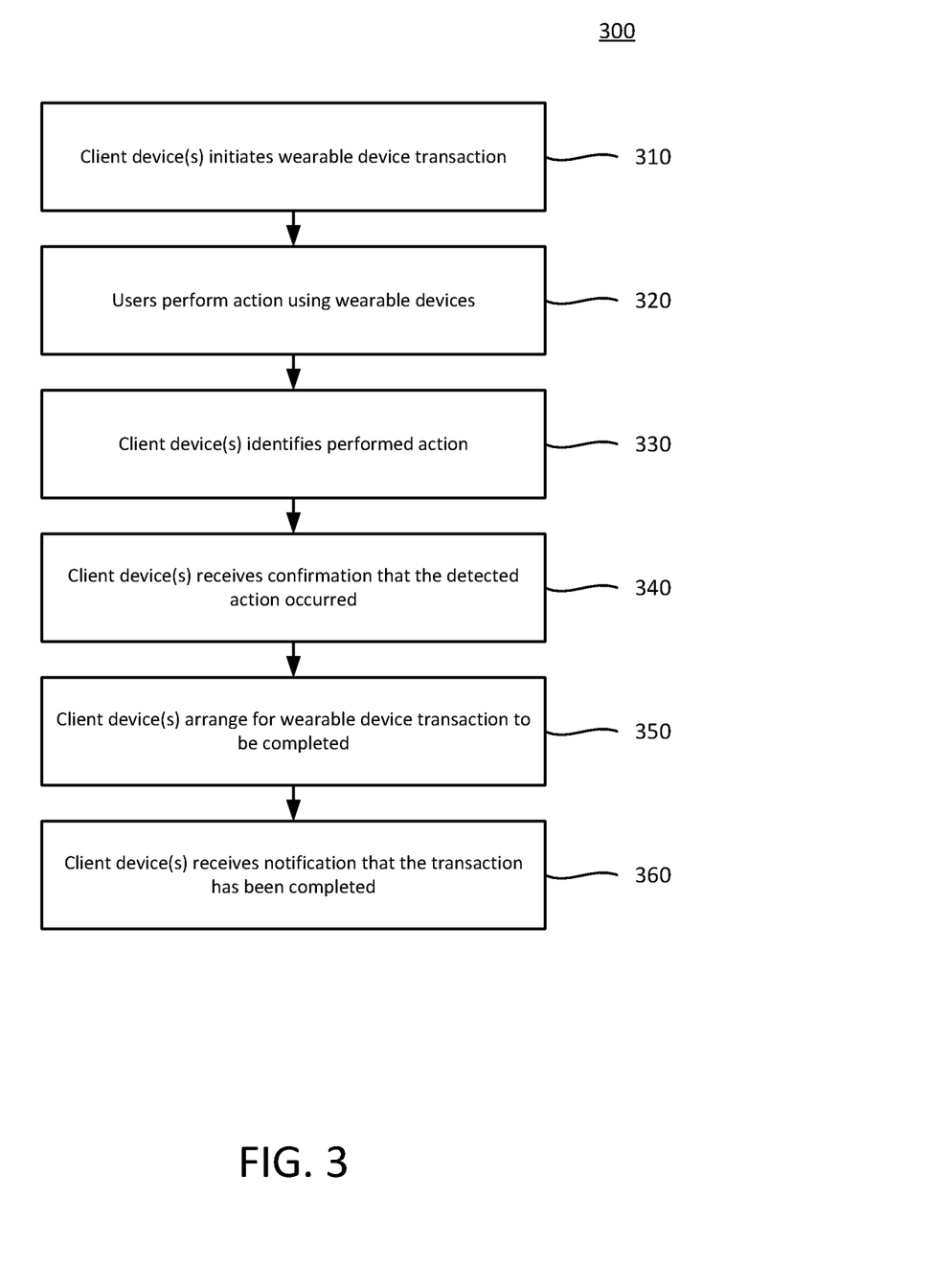
FIG. 3 is a flowchart of an exemplary process for executing a transaction, consistent with disclosed embodiments.

FIG. 3 is a flowchart of an exemplary process 300 for executing a transaction. Process 300 is described herein as a transaction between client device 110 and client device 115, and associated users 112 and 117. For example, process 300 may be executed as a financial transaction to transfer funds between financial accounts respectively associated with user 112 and user 117. In addition, it should be understood that some or all of the steps of process 300 may be executed between client device 110 and merchant device 120 (e.g., instead of client device 115) to perform a similar wearable device transaction. It should also be understood that the process steps associated with client device 115 may be omitted, such that client device 110 alone may perform a transaction.

In an exemplary embodiment, process 300 includes initiating a transaction with client device 110 and/or client device 115 (step 310). For example, user 112 may initiate a transaction by inputting information to client device 110. In an exemplary embodiment, user 112 may operate an I/O device associated with processing device 114, such as interface hardware. For example, user 112 may input information to processing device 114 via a touch screen or keypad. In some embodiments, user 112 may operate processing device 114 to execute a mobile application configured to facilitate the transaction. User 112 may open the mobile application to initiate the transaction. Additional instructions associated with the mobile application may be executed to prompt user 112 to input additional information related to the transaction. In some embodiments, client device 110 may send a notification to client device 115 to indicate that the transaction has been initiated. Step 310 may further include initiating the transaction with client device 115. For example, user 117 may similarly input data to processing device 119 to initiate the transaction with client device 115. In some embodiments, client device 115 may send a return notification to client device 110 to indicate that the initiated transaction has been agreed to and/or acknowledged.

After process 300 has been initiated, one or more of users 112 and 117 may perform an action with wearable devices 113 and/or 118 to continue the transaction (step 320). In some aspects, the actions performed by users 112 and 117 using wearable devices 113 and 118 may signify that each user is authorizing the transaction to occur. In this way, an action performed with wearable devices 113 and/or 118 may take the place of a password/PIN that may otherwise be required for a secure transaction. In other aspects, the actions serve as an indicator that the transaction has been initiated and may be further processed to completion.

In one embodiment, the actions may be substantially similar and substantially simultaneous. For example, user 112 and user 117 may shake hands with each other. As will be described in more detail below, the type and content of the actions may be selected depending on the configuration of the wearable devices 113 and 118. For example, in an embodiment in which users 112 and 117 perform the actions by shaking hands with each other, the wearable devices 113 and 118 may each be a device that includes a motion sensor and/or accelerometer configured to identify the user movement associated with shaking hands.

As the action is being performed and/or after its completion, one or more of client device 110, 115 may identify the action (step 330). In some embodiments, the action may be identified by one or more sensors (sensor hardware) associated with wearable devices 113 and/or 117. The sensors may detect the action in a manner known in the art. For example, in an embodiment in which wearable device 113 is a smart band with an accelerometer (e.g., a Pebble Watch®) and the action is shaking hands, the accelerometer may detect the movement of the arm of user 112 as user 112 shakes hands with user 117.

Wearable device 113 may execute software instructions (via processing device 114 or other processing unit) to interpret data from the one or more sensors. The data may be processed to determine if a particular action has taken place. For example, processing unit 114 may receive the data and determine if it can be categorized as constituting a particular action. For example, processing unit 114 may analyze received data to determine if signals from an accelerometer match programmed criteria corresponding to user 112 shaking hands. Client device 115 (with wearable device 118 and processing device 119) may similarly interpret data associated with an action performed by user 117 to determine if an action has occurred.

In some embodiments of process 300, client device 110 and/or client device 115 may receive confirmation from users 112 and 117 that the detected action occurred (step 340). Processing device 114 may identify an action and notify user 112 that the action was identified. For example, processing device 114 may identify that an action of shaking hands has occurred and subsequently generate a notification that may be displayed to user 112 via a component of client device 110. The notification may include a prompt requesting that user 112 confirm that the action took place (and that user 112 intended it to take place). User 112 may input data to processing device 114 to either confirm or deny that the interpreted action was an intended action that actually occurred. Client device 115 may perform similar steps to receive confirmation from user 117. In addition or alternatively, client device 110 may transmit a notification to client device 115 indicating that the transaction has been detected by client device 110, the transaction will be completed, the transaction has been authorized, etc.

It should be understood that the step of confirming the action may be omitted from process 300. In certain situations, the probability that a detected action corresponds to an actual, deliberate action may be sufficiently high that confirmation from one or more of users 112 and 117 may be unnecessary. In other embodiments, confirmation may only be necessary in situations in which processing units 114, 119 determine that a probability that an intended action occurred is less than a predetermined threshold. Determined probabilities above the threshold may not require confirmation.

After the action has been identified (and confirmed, if necessary), client devices 110 and/or 115 may execute additional instructions to arrange for the transaction to be completed (step 350). In an exemplary embodiment, client device 110 may transmit a notification to transaction device 130. The notification may include data that informs transaction device 130 that an action corresponding to a transaction has taken place. For example, client device 110 may transmit a notification to transaction device 130 to inform transaction device 130 that wearable device 113 was used in a particular action (e.g., to shake hands).

Client device 110 and/or transaction device 130 may associate the data related to the action with a transaction that was initiated in step 310. In this way, transaction device 130 may receive information related to the transaction in addition to the notification that the action has taken place. In some embodiments, client device 110 may send the information related to the initiated transaction to transaction device 130 prior to the action taking place. When transaction device 130 receives a notification that an action has occurred, transaction device 130 may associate the data with previously received transaction data (e.g., by matching the data by common user 112).

Client device 115 may similarly notify transaction device 130 that an action has been detected. The action in this case may be associated with wearable device 117. Transaction device 130 may receive the transmitted data and associate the data with other corresponding transaction information. For example, transaction device 130 may associate the data from client device 115 with data from client device 110 based on information input to client devices 110 and/or 115 in step 310. In other embodiments, transaction device 130 may use other received data, such as GPS coordinates and/or an action time stamp (e.g., data indicating a time that the action occurred and/or was detected) to match received data. In this way, transaction device 130 may associate data from client device 110 with data from client device 115 and thereby determine whether the total data represents that corresponding actions have occurred.

Transaction device 130 may make a determination based on the received data whether an action corresponding to a transaction between user 112 and 117 has occurred. If transaction device 130 determines that an action corresponding to a transaction occurred, transaction device 130 may execute additional instructions to carry out the transaction. For example, transaction device 130 may be associated with a financial service provider of which user 112 is a customer. The financial service provider may arrange for one or more parts of the transaction to take place based on the intended transaction. For example, transaction device 130 may identify that user 112 is executing a transaction to transfer funds to user 117 (e.g., make a payment to them). The financial service provider associated with transaction device 130 (and at which user 112 maintains a financial account—e.g., a checking account) may arrange for the funds to be transferred to user 117 in a manner known in the art. For example, transaction device 130 may arrange for funds to be transferred to an account held by user 117, a check to be sent to user 117, etc.

After the transaction has been completed, transaction device 130 may send a notification to one or more of client devices 110, 115 (step 360). Client devices 110 and/or 115 may receive the notification and display it to a respective user 112 and/or 117. In this way users 112 and/or 117 may be notified that their transaction with the other user 112 or 117 has been completed.

Process 300 provides an exemplary process by which user 112 may complete a transaction with user 117 via wearable devices 113 and 118. In other embodiments, client devices 110 and 115 may execute parts of process 300 without the use of wearable devices 113 and 118. For example, client devices 110 and 115, using processing devices 114 and 119, may provide the functionality of wearable devices 113 and 118 (e.g., through use of sensors or imaging devices not associated with any wearable device). The constituent steps of process 300 and exemplary manners in which the steps may be completed are described in more detail in FIGS. 4-6.

Figure 4:
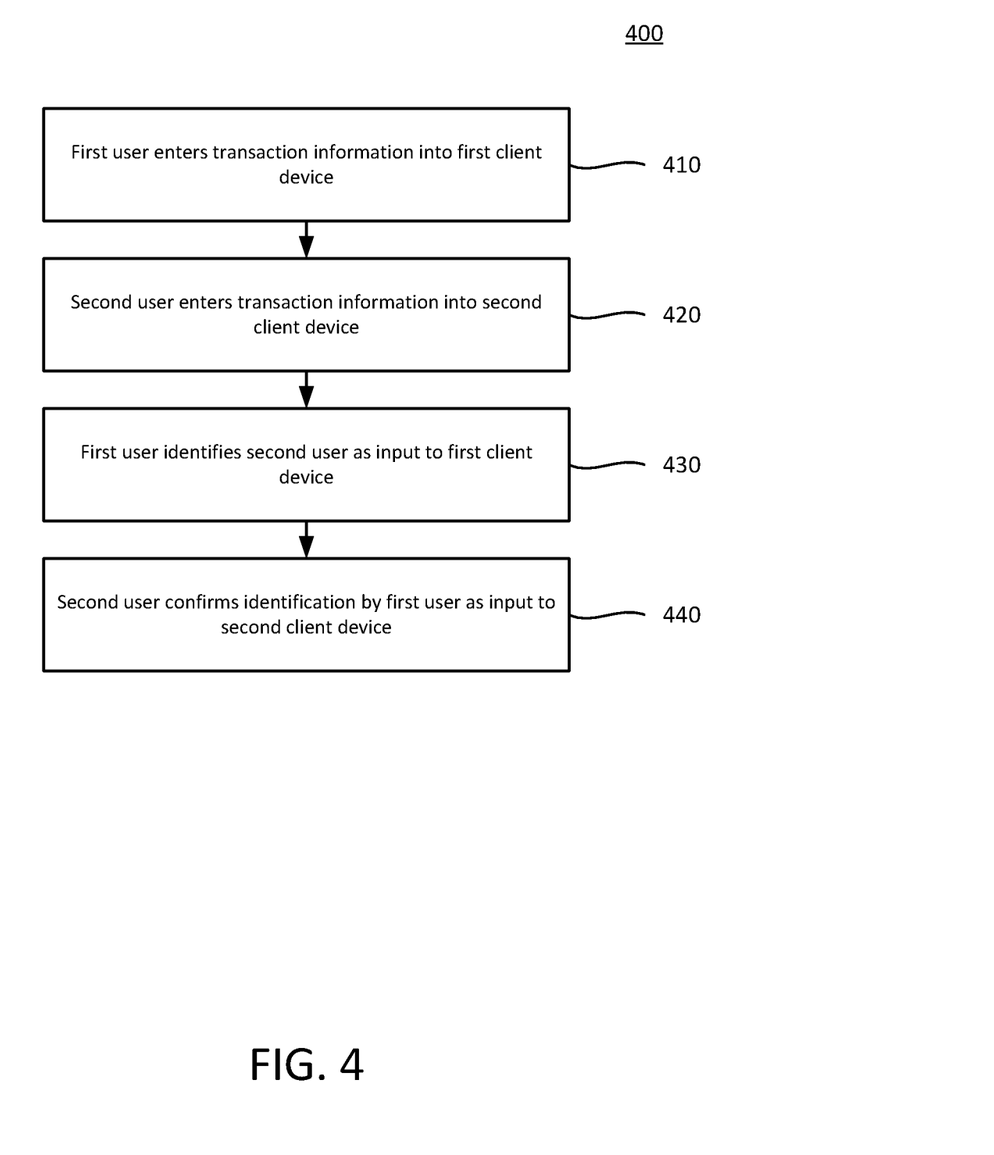
FIG. 4 is a flowchart of an exemplary process for initiating a transaction that may be carried out in conjunction with the process of FIG. 3, consistent with disclosed embodiments.

FIG. 4 depicts an exemplary process 400 for using client devices 110 and 115 to initiate a transaction. Process 400 may at least partially correspond to step 310 of process 300. Process 400 may include user 112 providing transaction information to client device 110 (step 410). For example, user 112 may use an I/O device associated with processing device 114 to input information, which may include a type of transaction, an amount of funds involved in the transaction, identification of goods involved in the transaction, etc.

Processing device 114 may receive the transaction information and may store the information in an associated memory. In addition or alternatively, processing device 114 may send the transaction information to transaction device 130.

In an exemplary embodiment of process 400, user 117 may provide transaction information to client device 115 (step 420). For example, user 117 may use an I/O device associated with processing device 119 to input information, which may include a type of transaction, an amount of funds involved in the transaction, identification of goods involved in the transaction, etc. Processing device 119 may receive the transaction information and may store the information in an associated memory. In addition or alternatively, processing device 119 may send the transaction information to transaction device 130.

In exemplary process 400, users 112 and 117 may be initiating a transaction in which funds are transferred from user 112 to user 117. In this embodiment, process 400 may further include user 112 inputting to client device 110 the user 117 to which the funds should be sent (step 430). In some embodiments, user 112 may input the recipient into processing device 114 by entering identifying information, such as the name, contact information, account information, etc. of user 117. In another exemplary embodiment, user 112 may select user 117 from a list of potential recipients generated by processing device 114.

Processing device 114 may generate the list of potential recipients based on previously received data. In one example, the previously received data may include a contact list created by user 112. In another exemplary embodiment, the previously received data may be data received from transaction device 130. The data received from transaction device 130 may correspond to data received by transaction device in step 420 described above. For example, transaction device 130 may receive data from devices that have initiated a transaction (which may include client device 110 and 115, among other devices), transaction device 130 may transmit a notification to client device 110 indicating all devices and/or users that have initiated a transaction. This list of devices and/or users may be displayed to user 112, who may select the appropriate user 117. An identifier of the selected recipient (user 117) may be transmitted to transaction device 130 such that transaction device 130 is in possession of data indicating the sender, recipient, and subject (amount of money, identified goods, etc.) of the transaction. In another embodiment, the previously received data may be received directly from client device 115 (and other client devices in communication with client device 110).

In some embodiments, process 400 may further include user 117 confirming that they initiated a transaction with the identified sender 112 (step 440). For example, processing device 119 may receive data from transaction device 130 (or, alternatively, client device 110) indicating that user 117 was selected by user 112 as the recipient in the initiated transaction, which may be presented to user 117 via a display device. User 117 may input data to processing device 119 to confirm or deny the accuracy of the presented information. The inputted data may be transmitted to transaction device 130 and/or client device 110.

After all necessary information has be input by users 112 and 117, the transaction may be initiated and associated devices prepared to receive information related to an action performed by users 112 and/or 117 (i.e., step 320). In an alternative embodiment, steps 420 and 440 may be omitted from process 400. For example, only user 112 may input transaction information to client device 110. In these embodiments, information related to client device 115 and user 117 may be entered manually by user 112 into client device 110 or unknown until after an action (e.g., an action corresponding to step 320 of process 300) is performed.

Figure 5:
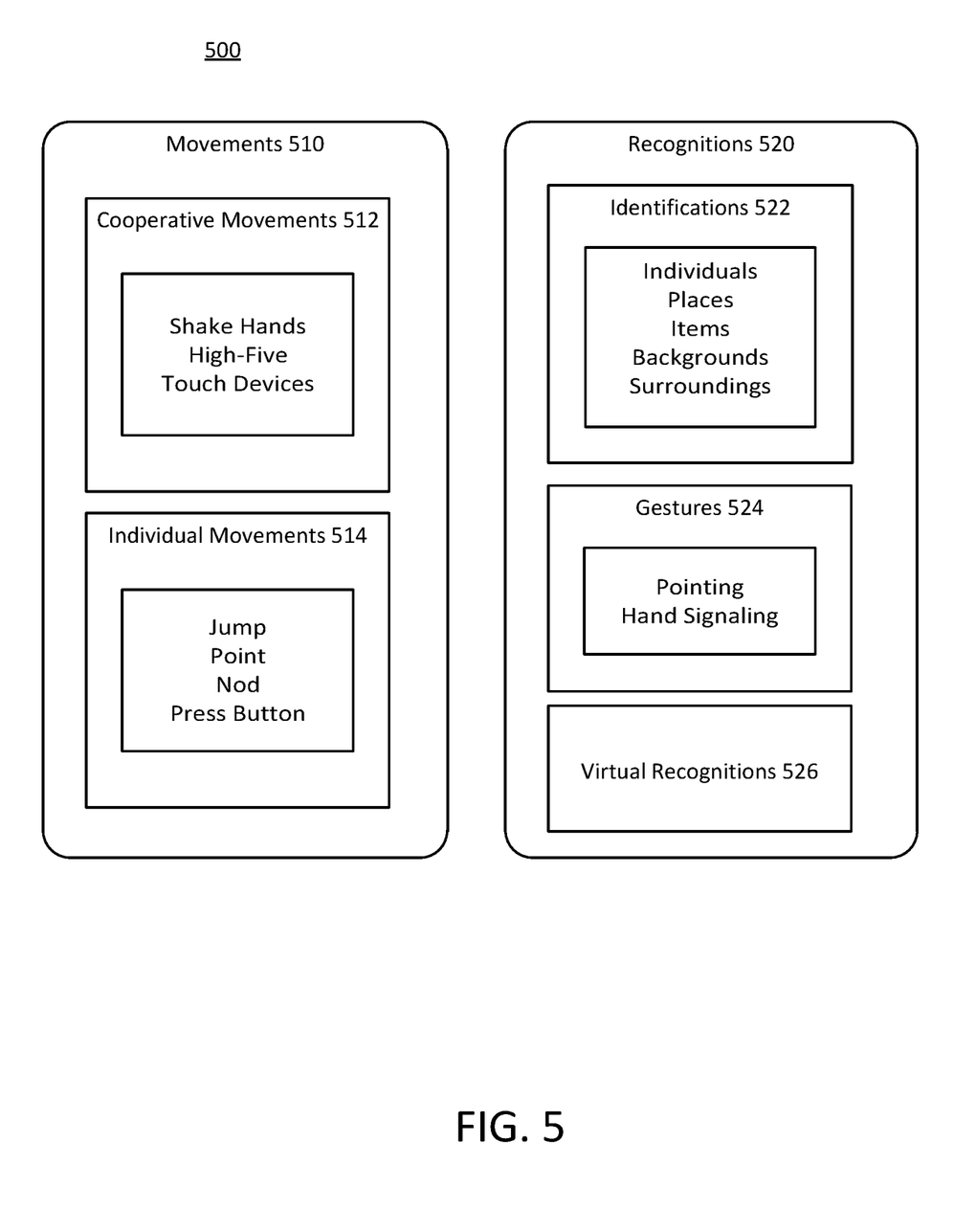
FIG. 5 is a depiction of exemplary actions that may be used in conjunction with the process of FIG. 3, consistent with disclosed embodiments.

After all necessary information has been entered to client devices 110 and 115, process 400 may end and process 300 may continue with users 112 and/or user 117 performing an action (e.g., as in step 320). FIG. 5 shows various exemplary actions that may be used as an action that takes place as part of process 300. For example, FIG. 5 depicts multiple categories of actions, depending on the configuration of client devices 110 and 115, and in particular, the configuration of wearable devices 113 and 118.

As shown in FIG. 5, possible actions 500 may be categorized into movements 510 and recognitions 520. Movements 510 may include cooperative movements 512. Cooperative movements 512 may include actions such as shaking hands, high-fiving, touching devices, etc. Cooperative movements 512 may be any movements in which each user 112 and 117 cooperates to complete a gesture (e.g., hand signal) or other movement that requires both users 112 and 117 to perform substantially the same action at substantially the same time.

Movements 510 may also include individual movements 514. Individual movements 514 may include actions such as jumping, pointing, nodding, etc., which may be actions performed individually by user 112 and/or user 117, but do not depend on the other user's movement for completion. In an exemplary embodiment, any combination of individual actions 514 may be performed by both user 112 and user 117 to complete the action. For example, users 112 and 117 may both jump or point at each other. Further, each individual action of users 112 and 117 may be performed simultaneously or at substantially different times, depending on the parameters of the action. Another exemplary individual action may be include pressing a button (e.g., a button a respective wearable device 113, 118).

Movements 510 may be used as actions 500 when wearable devices 113 and 118 include sensors configured to detect the movements. For example, movements 510 may be used when wearable devices 113 and 118 include motion sensors and/or accelerometers. In this way, wearable devices 113 and 118 may be configured to detect the movements. The type of movement 510 may be further selected based on the types of motion a particular wearable device 113 and/or 118 may be configured to detect. For example, shaking hands may be best suited for wearable devices 113 and/or 118 capable of detecting hand, wrist, and/or arm motion of associated user 112 or 117 (e.g., Pebble Watch®). Similarly, an action of nodding may be best suited for a wearable devices 113 and/or 118 capable of detecting head and/or neck movement associated with user 112 or 117 (e.g., Google Glass®).

Recognitions 520 may include actions that require wearable devices 113 and/or 118 to visually interpret and/or process one or more objects via a camera or other lens device. Recognitions 520 may include identifications 522. Identifications 512 may include pictures of individuals (e.g., one of users 112 and 117), places, items, backgrounds, surrounds, etc. Wearable devices 113, 118 may receive visual data and execute software instructions to identify the visual data and match the data to a known entity, such as a person, place, or object. Process 300 may use identifications 520 as the action in situations in which wearable devices 113, 118 each identify a nearby person, place, or object, and this information supplies sufficient information to allow process 300 to continue. For example, the action may include each user 112 and 117 taking a picture of each other. Through the corresponding pictures of each other, the action may be satisfactorily completed such that it is known that each person is participating in the action. For example, processing devices 114 and 119 may execute software instructions to complete a recognition algorithm configured to determine that each one or more of users 112 and 117 is in the image. In this way, the action may result in processing devices 114 and 119 received data regarding the location of each user 112 and 117. This data may satisfy completion of an action.

Recognitions 520 may also include gestures 524. Gestures 524 may include, for example, visual data corresponding to an action by one or more of users 112 and 117. Gestures 524 may be similar to movements 510, however, gestures 524 may be identified visually instead of physically. For example, gestures 524 may include actions such as each user 112 and 117 pointing at each other or hand signals, which may be detected by a camera or other lens device and classified as an action.

As further shown in FIG. 5, recognitions 520 may also include virtual recognitions 526. Virtual recognitions 526 may include actions that are at least partially defined by electronic data, and may or may not include physical objects. For example, virtual recognitions 526 may occur as interactions between virtual people in a virtual space, such as a video game or virtual reality. An interaction between objects in the virtual space may be identified as an action sufficient to satisfy the requirements of process 300. Exemplary virtual recognitions may take place via wearable devices 113 and 118 in the form of virtual reality headsets that interpret movements and/or thoughts of users 112 and 117 and display the results in a virtual space. Users 112 and 117 may interact with each other in the virtual space, which may be recognized as electronic data. The recognized data may be identified by wearable devices 113 and/or 118 as constituting an action for the purposes of process 300.

Virtual recognitions 526 may include "private areas" within a virtual world such as a room in a video game or a chat room that is only accessible to users 112 and 117. In such a scenario, a virtual "key" or gesture used as payment can be transferred and confirmed by the wearable devices 113 and/or 118 as authentication. In this way, the transaction may occur without the risk of detection found in more public places. A key can identify each user 112 and 117, and the virtual gesture or actions may act as password/PIN to authorize payment (or receipt of payment).

In a virtual setting, the actions of the characters themselves would initiate the transaction. An actual "handing over" of goods in the virtual environment, for example, may represent the transfer of funds. Client device 110 and 115 and/or transaction device 130 may execute instructions that perform one or more processes that enable the virtual transaction to be processed outside of the virtual environment. For example, one or more processes may be performed such that tokens and keys are exchanged and digitally signed to confirm identities and track the transaction.

The possible actions 500 shown in FIG. 5 are an exemplary list and should not be considered exhaustive. It should be understood that the performed action could be any action performed by one or more of users 112 and 117 using one or more of wearable devices 113 and 118. For example, exemplary actions may be verbal, and one or more of client device 110 and client device 115 may detect and/or process the exemplary actions. In some aspects, voice recognition may provide security/authentication, and transcription into text may provide a precise definition of the transaction and confirmations. In some embodiments, biometric (e.g., a photograph of a thumbprint) information may also be used to authenticate.

In an exemplary embodiment, regardless of the type of action 500, the action may be a concerted action (i.e., an action in which both users 112 and 117 perform an action and each of wearable devices 113 and 118 is used). In this way, participation of each use 112 and 117 may be included and authentication of the action is more likely.

Regardless of what action 500 is used to satisfy step 320 of process 300, it should be understood that the action may result in corresponding data being received by processing devices 114 and 119 from wearable devices 113 and 118. In this way, processing devices 114 and 119 may transmit the information between client devices 110 and 115, merchant device 120, and/or transaction device 130 to continue process 300. For example, the data associated with the performed action may be shared between client devices 110 and 115. Client device 110 may analyze the combined data to determine that the action occurred. Client device 110 may subsequently transmit a notification to transaction device 130, indicating that the action has been completed and that process 300 may continue.

Figure 6:
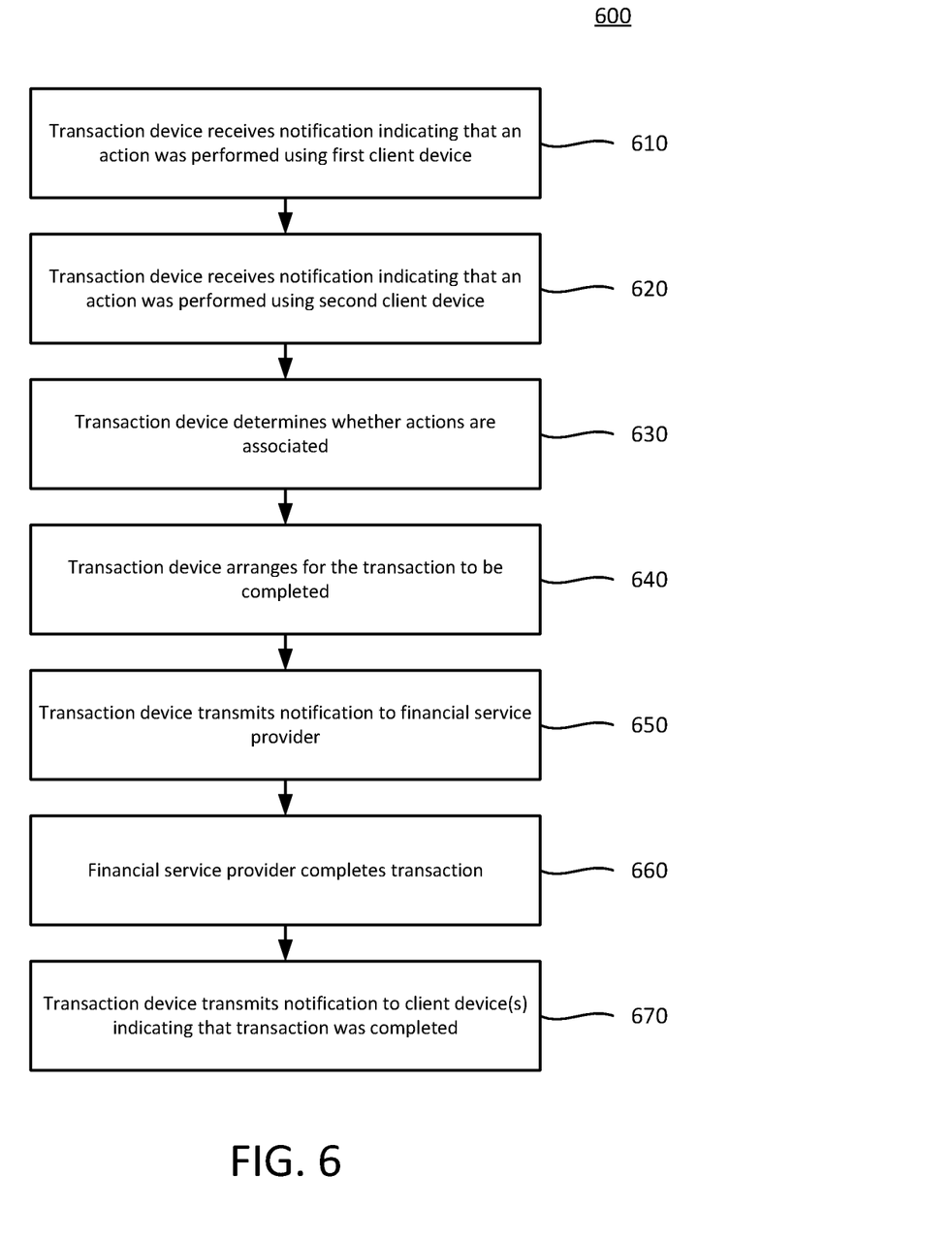
FIG. 6 is a flowchart of an exemplary process for completing execution of a transaction that may be carried out in conjunction with the process of FIG. 3.

In other embodiments, the data associated with the performed action may be individually sent by each client device 110, 115 to transaction device 130. FIG. 6 depicts an exemplary process 600 by which transaction device 130 may contribute to the completion of process 300 (e.g., complete steps 350 and 360). In process 600, transaction device 130 may receive a notification that includes data indicating that an action was performed using client device 110 (step 610). In an exemplary embodiment, the data may be sent from wearable device 113 to processing device 114 to transaction device 130.

In addition, transaction device 130 may receive a notification including data that similarly indicates that an action was performed using client device 115 (step 620). As with step 610, step 620 may include wearable device 118 sending the data to processing device 119, which may forward the data to transaction device 130. In this way, transaction device 130 may include information indicating that an action occurred using both client device 110 and 115.

After transaction device 130 receives the data related to the performed action, transaction device 130 may determine if sufficient information has been received to continue the transaction (Step 630). Transaction device 130 may receive multiple notifications from many client devices. Transaction device 130 may compare data from all received notifications to determine that an action between two client devices (e.g., client devices 110 and 115) has occurred. As described above, transaction device 130 may interpret data such as received location data and time stamp information to determine that two actions may be related. Transaction device 130 may further compare the data associated with the two actions to determine if the actions are associated with an initiated transaction between user 112 and user 117. Based on the available information, transaction device 130 may make a final determination regarding whether the process should continue.

If transaction device 130 determines that the process should continue (e.g., a concerted action corresponding to an initiated transaction has taken place), transaction device 130 may arrange for the transaction be completed (step 640). For example, transaction device 130 may arrange for an actual exchange of funds and/or goods.

In order to arrange for the transaction to be completed, transaction device 130 may send a notification to one or more financial service providers (step 650). In an exemplary embodiment, transaction device 130 may be a computing device associated with a financial service provider with which user 112 maintains a financial account. In this embodiment, transaction device 130 may execute software instructions to process the transaction. For example, transaction device 130 may transmit the notification to another computing device associated with the financial service provider, which may carry out the transaction.

After the financial service provider completes the transaction (step 660), transaction device 130 may send a notification to one or more of client devices 110 and 115 to notify users 112 and/or 117 that the transaction has been completed (step 670). Step 670 may correspond to step 360 of process 300. Processes 300 and 600 may end after one or more of users 112 and 117 have been notified that the transaction has been completed. In some embodiments, the notification may be in the form of a message (e.g., sms message, e-mail, etc.) sent to client device 110 or client device 115. The message may be displayed to user 112, 117 via wearable devices 113, 118 and/or processing devices 114, 119. It should be understood however, that steps 360, 670 are optional steps configured to provide information to users 112, 117. Exemplary processes consistent with disclosed embodiments may omit these steps.

Figure 7:
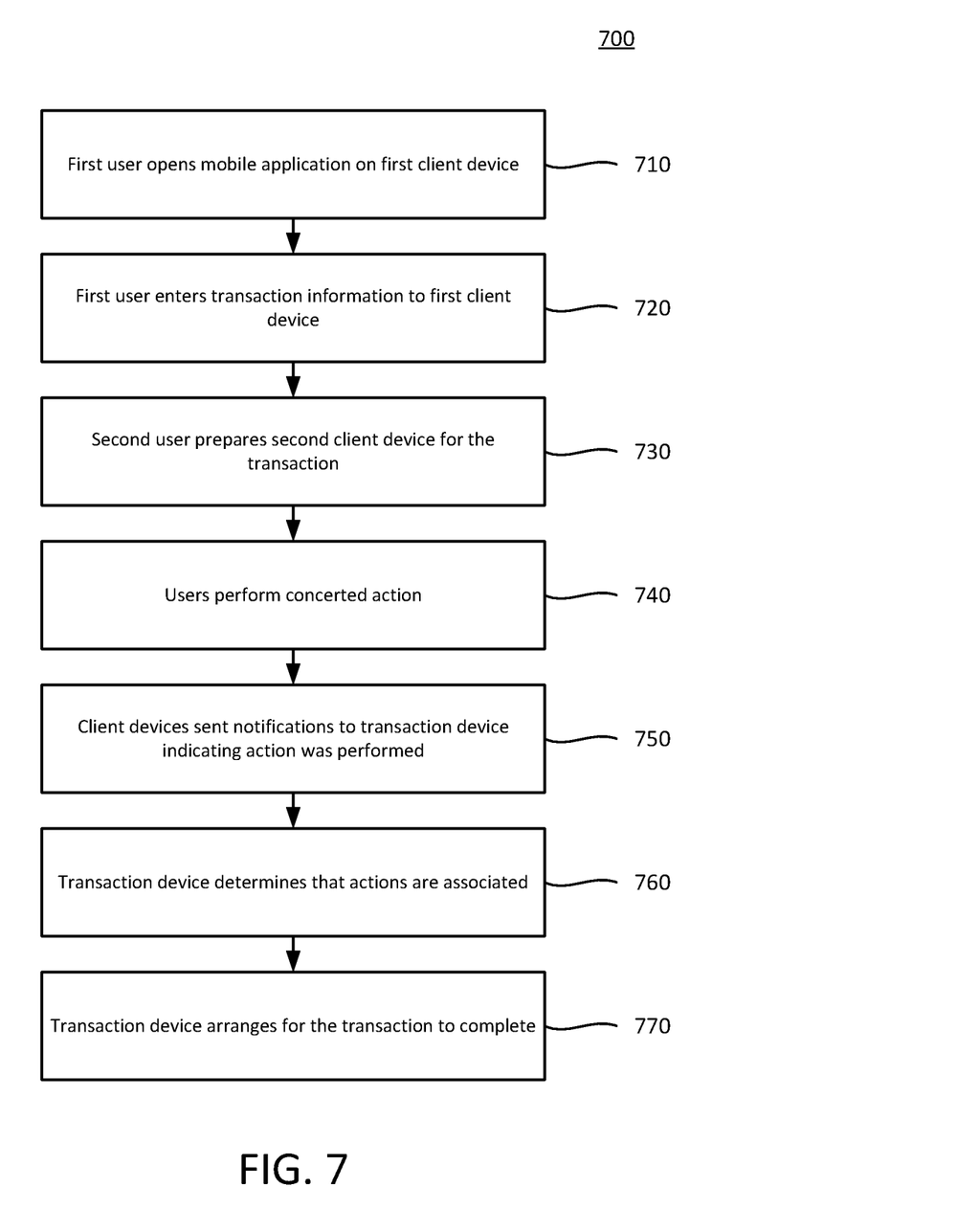
FIG. 7 is a flowchart of an exemplary processes for executing a transaction between two users, consistent with disclosed embodiments.

FIG. 7 depicts an exemplary process 700 representative of further exemplary embodiments of process 300. Exemplary process 700 depicts a process by which a transaction between user 112 and user 117 (e.g., a payment from user 112 to user 117) is processed. User 112 may operate client device 110, which may include wearable device 113 as a watch with a display and an accelerometer. In exemplary process 700, processing device 114 may be a mobile device (e.g., smart phone) in electronic communication with wearable device 113 and having a GPS device. Similarly, user 117 may operate client device 115, which may also include wearable device 118 as a watch with a display and an accelerometer and processing device 119 as a mobile device (e.g., smart phone) in electronic communication with wearable device 118 and having a GPS device. While the wearable devices 113, 118 and processing devices 114, 119 have been described herein as separate devices, it should be understood that they may be integrated into a single wearable device.

In process 700, user 112 may cause processing device 114 to execute software instructions to open a mobile application associated with making the wearable device transaction (step 710). After the application is open, user 112 may enter information to processing device to specify an amount of money to be sent via the transaction (step 720). In this way, processing device 114 may be primed to look for an action that corresponds to the initiated transaction. The particular action may be predetermined by processing device 114, or the action may be selected by user 112.

User 117 may prepare client device 115 for the transaction (step 730). In one embodiment, user 117 may execute similar steps to steps 710 and 720 using processing device 119. For example, user 117 may open a mobile application on processing device 119 and input an amount of money to be received. Alternatively, processing device 119 may be programmed to always look for particular actions that may correspond to a wearable device transaction. User 117 may set preferences such that processing device will always process data associated with particular actions when the associated transactions result in the user receiving money or goods, or receiving particular amounts of money or particular goods. In any case, processing device 119 may be configured to receive data from wearable device 118 and forward the data to another device, as necessary.

With client devices 110 and 115 prepared for a particular action to continue the transaction process, users 112 and 117 may perform the action (step 740). In the exemplary embodiment in which wearable devices 113 and 118 are watches with accelerometers, the action may be shaking hands, and the accelerometers may detect that a respective wearable device 113, 118 has been used in a hand-shaking action. Each wearable device 113, 118 may separately interpret data from the associated accelerometer and send the data to a respective processing device 114, 119. Processing devices 114, 119 may determine that the data associated with each action corresponds to an action that continues the transaction process. For example, processing devices 114, 119 may have been looking for data corresponding to a hand-shaking action and may therefore determine that such an action has taken place.

Processing devices 114, 119 may continue process 700 by sending one or more notifications to transaction device 130 (step 750). Each notification may include data indicating that the hand-shaking action has taken place. In addition, each notification may include identifying information, such as an identifier of user 112 or 117 (e.g., user name) a GPS location determined by the GPS device associated with each processing device 114, 119, and a time stamp indicating the time the action was detected, for example.

Transaction device 130 may receive the notifications from processing device 114, 119 and execute additional processing steps to complete the transaction. In the embodiment of process 700, transaction device 130 may interpret the received data to determine that the actions of each wearable device 113, 118 are associated (step 760). In some embodiments, the received transaction data may be sufficient to determine that the two actions are associated. For example, transaction device 130 may determine that the GPS locations, time stamps, and transaction information (e.g., payment amount) match to a degree that allows for a determination that they occurred as part of the same transaction. In other embodiments, transaction device 130 may send a notification to one or more of processing devices 114, 119 seeking confirmation that the action were intended to cause the transaction to occur.

After transaction device 130 has determined that the actions are sufficiently associated with an action intending to cause the transaction to occur, transaction device 130 may arrange for the transaction to complete (step 770). As described above with respect to process 600, the transaction may be arranged to be completed by components of one or more financial service providers to transfer money in the amount of the transaction from an account associated with user 112 to an account associated with or directly to user 117.

For example, once the transaction is verified and accepted by both users 112 and 117 (via, e.g., client device 110 and 115), the transfer of funds may occur in a number of ways. In an exemplary embodiment, one or more components, such as transaction device 130, may execute instructions to perform one or more processes to invisibly (to the parties) digitally wire funds between the user 112 and 117 accounts. This may occur as a direct transfer (within the same institution) or a Wire Transfer. In some embodiments, a third party such as PayPal™, Google Wallet™, or Dwolla™ may facilitate the transfer. Alternatively or in addition, a "bill pay" account may be used to transfer money via ACH or a paper check.

Process 700 may optionally include transaction device 130 sending one or more notifications to client device 110 and/or 115 to inform users 112 and/or 117 that the transaction has been completed.

The exemplary disclosed systems and processes for executing a wearable device transaction may allow two entities (e.g., two individuals or an individual and a merchant) to conduct a transaction. Users may use wearable devices and concerted action thereof to indicate that the users are intending to complete a transaction. In this way, other, more time consuming, authentication and security processes may be avoided. For example, users may simply "shake hands" to authenticate a transaction between them. Additional effort by each user may only include initialization of the transaction (by one or both of the users) and optionally may include confirmation steps for added security and authentication. In some embodiments, users may use mobile devices (e.g., smart phones and/or tablets) that provide the functionality of a wearable device, but are not actually worn by the user.

The action is not limited to particular concerted actions and may use currently existing technology to allow adaptation for use in a wearable device transaction. Similarly, disclosed embodiments may take advantage of the nature of wearable devices to interpret an action of a user.

As discussed above, the exemplary disclosed systems and methods may also be applicable to transactions between customers and merchants. For example, a customer may operate a wearable device at a merchant location to pay for a good or service. Information received by the wearable device may include merchant name and location, as well as the good to be purchased, allowing for authentication of the transaction. In some embodiments, the merchant may include a wearable device. For example, an employee of a merchant (e.g., a cashier) may wear a wearable device and operate the wearable device to complete a transaction with a customer, in a manner consistent with one or more of the processes disclosed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone. Further, while two users operating two client devices are primarily described, it should be understood that three or more users operating three or more client devices may be use similar systems and processes to complete wearable device transactions between the three or more users.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A system for executing a transaction, comprising:
a first device associated with a first user, the first user associated with a first avatar, the first device comprising:
a motion sensor,
a first processor, and
a first memory storing first instructions that, when executed by the first processor, cause the first processor to perform first operations comprising:
generating a virtual reality;
detecting, using the motion sensor, a first action of the first avatar in the virtual reality;
sending, over a network outside of the generated virtual reality, a transaction request comprising a description of the first action to be performed by the first avatar of the first user in the virtual reality and a second action to be performed by a second avatar of a second user in the virtual reality to a transaction device;
sending a notification of the detected first action to the transaction device;
generating a signal comprising at least one of location data or time stamps associated with the first action in the virtual reality and sending the signal to the transaction device; and
wherein the transaction device comprises:
at least one second processor, and
at least one second memory device storing second instructions that, when executed by the at least one second processor, cause the at least one second processor to perform second operations comprising:
receiving, from the network outside of the generated virtual reality, the transaction request comprising the description of the first action to be performed by the first avatar of the first user in the virtual reality and the second action to be performed by a second avatar of a second user in the virtual reality and the notification of the detected first action from the first device;
receiving the signal comprising the data comprising the at least one of location data or time stamps associated with the first action in the virtual reality from the first device;
receiving a notification of the second action of the second avatar and data comprising at least one of location data or time stamps associated with the second action
determining, that the received transaction request, the received signal, the received data, the received notification of the detected first action, from the first device and the received notification of the second action and the at least one of location data or time stamp associated with the second action correspond to the description; and
based on the determination, approving the requested transaction over the network.

2. The system of claim 1, wherein the first device further comprises at least one of an accelerometer or a camera.

3. The system of claim 1, wherein:
the first device further comprises a virtual reality headset.

4. The system of claim 1, wherein determining that the first and second actions correspond to the description comprises requesting at least one of the first user or the second user to input a virtual key for authentication.

5. The system of claim 1, wherein:
the first device further comprises an imaging device generating image data; and
the second operations further comprise:
receiving, from the first device, image data; and
matching the image data to at least one of a known entity or action.

6. The system of claim 5, wherein the image data comprises at least one of a single image, a sequence of images, or a continuous stream of images.

7. The system of claim 5, wherein:
determining that the first and second actions correspond to the description is based at least in part on the image data.

8. The system of claim 1, wherein:
the first device comprises a display; and
the first operations further comprise displaying, on the display, the transaction request.

9. The system of claim 8, wherein the second operations further comprise:
receiving, from the first device, an input associated with a type of action; and
approving the transaction request based on the input associated with the type of action.

10. The system of claim 1, wherein the second operations further comprise sending a notification to a second device that the transaction request has been initiated.

11. The system of claim 10, wherein the second operations further comprise receiving a return notification from the second device that the approved transaction request has been at least one of agreed to or acknowledged.

12. The system of claim 1, wherein the first device further comprises at least one of a touch screen or a keypad.

13. The system of claim 1, wherein:
the first device further comprises a display; and
the first operations further comprise generating interface screens on the display by executing browser software.

14. The system of claim 13, wherein the transaction request comprises at least one of a type of transaction, an amount of funds involved in the transaction, or an identification of goods involved in the transaction.

15. The system of claim 1, wherein the second operations further comprise receiving identification information associated with the first user and the second user.

16. The system of claim 15, wherein the identification information comprises at least one of images associated with the first and second users.

* * * * *

UNITED STATES PATENT AND TRADEMARK OFFICE
CERTIFICATE OF CORRECTION

PATENT NO. : 10,719,817 B2  
APPLICATION NO. : 15/868397  
DATED : July 21, 2020  
INVENTOR(S) : Richard S. Just et al.

Page 1 of 1

It is certified that error appears in the above-identified patent and that said Letters Patent is hereby corrected as shown below:

On the Title Page

Item (57), Line 2, "A wearable transaction device may client device" should read -- A wearable transaction device may be a client device --.

Signed and Sealed this
First Day of September, 2020

Andrei Iancu
*Director of the United States Patent and Trademark Office*